United States Patent
Shirado et al.

(10) Patent No.: US 10,105,843 B2
(45) Date of Patent: Oct. 23, 2018

(54) ROBOT DEVICE, REMOTE CONTROL METHOD OF ROBOT DEVICE, AND PROGRAM

(75) Inventors: Hirokazu Shirado, Kanagawa (JP); Yasuhiro Suto, Tokyo (JP); Takashi Kito, Kanagawa (JP); Akichika Tanaka, Chiba (JP); Kenichiro Nagasaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1133 days.

(21) Appl. No.: 13/051,478

(22) Filed: Mar. 18, 2011

(65) Prior Publication Data

US 2011/0238211 A1 Sep. 29, 2011

(30) Foreign Application Priority Data

Mar. 26, 2010 (JP) ................ 2010-073033

(51) Int. Cl.
*B25J 9/16* (2006.01)
*G05D 1/02* (2006.01)

(52) U.S. Cl.
CPC ... *B25J 9/1661* (2013.01); *G05B 2219/39381* (2013.01)

(58) Field of Classification Search
CPC ....... A61B 19/22; B25J 9/1671; B25J 9/1689; B25J 9/1661; G05D 1/0038; G05D 1/0246; G05D 1/0272; G05D 1/0282; G05D 1/0044; G05D 1/0274; G06K 9/00771; G05B 2219/39381
USPC ................................. 700/257, 264
See application file for complete search history.

(56) References Cited

U.S. PATENT DOCUMENTS

| 6,535,793 B2* | 3/2003 | Allard ................... B25J 9/1689 318/628 |
| 2005/0041839 A1* | 2/2005 | Saitou ................ H04N 1/00127 382/103 |
| 2005/0221840 A1* | 10/2005 | Yamamoto ........... G05D 1/0225 455/456.3 |

(Continued)

FOREIGN PATENT DOCUMENTS

| JP | 2003-269937 A | 9/2003 |
| JP | 2003-532218 A | 10/2003 |
| JP | 2006-88282 A | 4/2006 |

(Continued)

OTHER PUBLICATIONS

Japanese Office Action dated Feb. 4, 2014 in Patent Application No. 2010-073033.

(Continued)

*Primary Examiner* — Stephen Holwerda
(74) *Attorney, Agent, or Firm* — Xsensus, LLP

(57) ABSTRACT

There is provided a robot device including a behavior plan unit that detects a current status of the robot device or an external environment and that decides one behavior plan of a plurality of behavior plan candidates as a future behavior plan, based on the current status, and a display control unit that decides one display pattern of a plurality of previously prepared display pattern candidates as display content to be displayed on a remote control device that remotely controls the robot device based on the decided behavior plan and that cause the remote control device to display the display pattern decided by the behavior plan unit.

17 Claims, 7 Drawing Sheets

(56) References Cited

U.S. PATENT DOCUMENTS

2006/0095170 A1* 5/2006 Yang .................... G05D 1/0246
701/23
2009/0143912 A1* 6/2009 Wang .................... B25J 9/1671
700/259

FOREIGN PATENT DOCUMENTS

| JP | 2007-61983 A | 3/2007 |
|----|--------------|--------|
| JP | 2007-94743 A | 4/2007 |
| JP | 2007-111854 A | 5/2007 |
| JP | 2007-125631 A | 5/2007 |
| JP | 2007-213190 A | 8/2007 |
| JP | 2007-216363 A | 8/2007 |
| JP | 2008-16058 | 1/2008 |
| JP | 2008-68348 | 3/2008 |
| JP | 2008-276754 A | 11/2008 |
| JP | 2009-509673 A | 3/2009 |
| JP | 2009-136988 A | 6/2009 |

OTHER PUBLICATIONS

Office Action dated Jun. 17, 2014, in Japanese Patent Application No. 2010-073033.

* cited by examiner

ROBOT DEVICE, REMOTE CONTROL METHOD OF ROBOT DEVICE, AND PROGRAM

BACKGROUND OF THE INVENTION

Field of the Invention

The present invention relates to a robot device, a remote control method of a robot device, and a program.

Description of the Related Art

When a robot that autonomously moves and acts while recognizing an external environment is used for help at home or household tasks, the robot cannot autonomously perform all movement or actions desired by a user easily. One reason for this is that the robot incompletely recognizes an external environment. Therefore, the user needs to remotely control the robot by the user's instruction using a remote control device.

For example, Japanese Patent Application Laid-Open (JP-A) No. 2008-16058 discloses a technique of making a direction of a forward operation by a remote control device correspond to a shooting direction of a camera mounted in a robot in order to safely move the robot by remote control when an image taken by the camera is displayed on a monitor screen of the remote control device. Japanese Patent Application Laid-Open (JP-A) No. 2008-68348 discloses a technique of implanting task information in a working space of a robot in advance and giving an operating instruction to the robot in order to reduce a burden of an operator.

SUMMARY OF THE INVENTION

In JP-A No. 2008-16058, the direction of the forward operation is displayed on the display screen of the remote control device. Further, in JP-A No. 2008-68348, a model of an object that is a work target of the robot is displayed on the display screen.

The robot performs various actions such as movement, gripping an object, and transferring an object. For this reason, it is necessary to enable the remote control device to receive many operations corresponding to each action so that the robot can perform various actions. However, if an operation in the remote control device becomes complicated, there is an issue in that it becomes difficult for the user to remotely control the robot.

Further, the robot may move not only to a place that can be viewed by the user but also to a place that deviates from the user's field of vision. In this case, the user should operate the robot depending only on the display screen of the remote control device. At this time, since the display screen displays only a field of view visible from the robot side, there is an issue in that it is difficult for the user to operate.

In light of the foregoing, it is desirable to provide a robot device, a remote control method of a robot device, and a program, which are novel and improved, and in which a user can easily remotely control an autonomous robot device capable of remote controlling.

According to an embodiment of the present invention, there is provided a robot device including a behavior plan unit that detects a current status of the robot device or an external environment and that decides one behavior plan of a plurality of behavior plan candidates as a future behavior plan based on the current status, and a display control unit that decides one display pattern of a plurality of previously prepared display pattern candidates as display content to be displayed on a remote control device that remotely controls the robot device, based on the decided behavior plan and that cause the remote control device to display the display pattern decided by the behavior plan unit.

The robot device may further include an external environment recognition unit that recognizes an external environment, and an environment map generation unit that generates an environment map based on the external environment recognized by the external environment recognition unit and that specifies a position of the robot device or the remote control device based on the environment map. The behavior plan unit may decide the behavior plan based on the position of the robot device or the remote control device.

The robot device may further include a robot device position recognition unit that recognizes the position of the robot device. The behavior plan unit may decide the behavior plan based on the position of the robot device recognized by the robot device position recognition unit.

The behavior plan unit may receive the position of the remote control device from the remote control device and may decide the behavior plan based on the position of the remote control device.

The behavior plan unit may recognize current task content of the robot device and may decide the behavior plan based on the current task content of the robot device.

The display control unit may switch the display pattern in association with the current task content of the robot device.

According to another embodiment of the present invention, there is provided a remote control method of a robot device, including the steps of detecting a current status of the robot device or an external environment, deciding one behavior plan of a plurality of behavior plan candidates as a future behavior plan based on the current status, deciding one display pattern of a plurality of previously prepared display pattern candidates as display content to be displayed on a remote control device that remotely controls the robot device, based on the behavior plan decided, and causing the remote control device to display the display pattern decided.

According to another embodiment of the present invention, there is provided a program for causing a computer to function as a means for detecting a current status of the computer or an external environment, a means for deciding one behavior plan of a plurality of behavior plan candidates as a future behavior plan based on the current status, a means for deciding one display pattern of a plurality of previously prepared display pattern candidates as display content to be displayed on a remote control device that remotely controls the computer based on the behavior plan decided, and a means for causing the remote control device to display the display pattern decided.

According to the present invention described above, a user can easily remotely control an autonomous robot device capable of remote controlling.

DETAILED DESCRIPTION OF THE EMBODIMENT(S)

Figure 1:
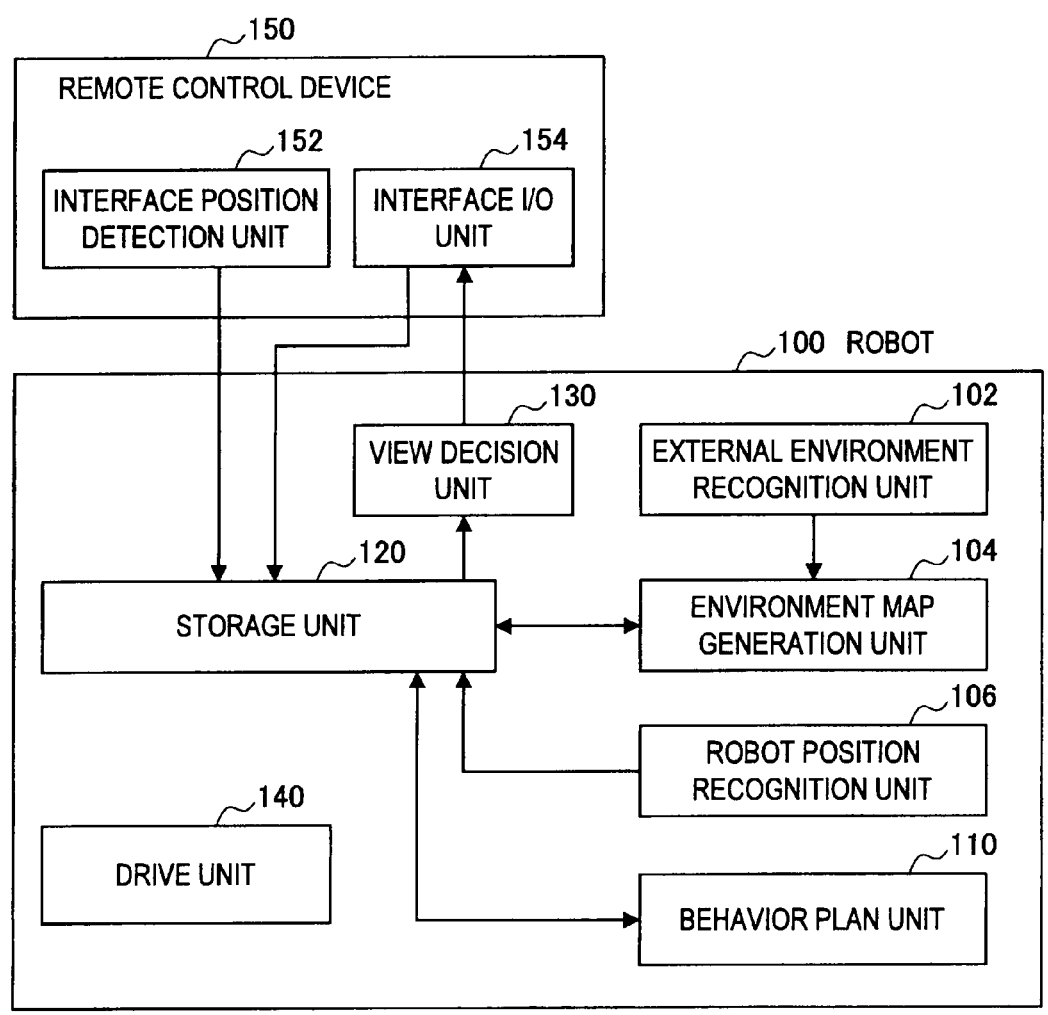
FIG. 1 is a block diagram illustrating a robot and a remote control device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, a description will be made in the following order:
1. A configuration of an embodiment
2. An operation of an embodiment.

1. A Configuration of an Embodiment

First, configurations of a robot 100 and a remote control device 150 according to an embodiment of the present invention will be described with reference to FIG. 1. FIG. 1 is a block diagram illustrating the robot 100 and the remote control device 150.

The robot 100 recognizes an external environment and autonomously performs movement corresponding to the environment or an action for a user. The robot 100 decides a sequential behavior plan. The robot 100 decides a view that is displayed on the remote control device 150 based on the decided behavior plan. Thereafter, the decided view is transmitted to the remote control device 150 and displayed on a user interface (UI) screen. As a result, since the view consistent with the robot's behavior is displayed on the remote control device 150, the user can easily remotely control the robot 100.

[The Robot 100]

For example, the robot 100 includes an external environment recognition unit 102, an environment map generation unit 104, a robot position recognition unit 106, a behavior plan unit 110, a storage unit 120, a view decision unit 130, and a drive unit 140.

For example, the robot 100 includes a microprocessor that controls, for example, the external environment recognition unit 102, the storage unit 120, and the drive unit 140. Further, the environment map generation unit 104, the robot position recognition unit 106, the behavior plan unit 110, the view decision unit 130, and the like are included in the microprocessor.

The external environment recognition unit 102 includes, for example, a stereo camera and a laser range finder (LRF) disposed in the robot 100 and recognizes the external environment of the robot 100. The external environment recognition unit 102 transmits information related to the recognized external environment, for example, to the environment map generation unit 104.

The environment map generation unit 104 generates an environment map based on the information related to the external environment. The environment map may be generated using a technique such as simultaneous localization and mapping (SLAM). The environment map generation unit 104 transmits the generated environment map to the storage unit 120. The environment map may be sequentially updated to be capable of tracking a person or an object present in the external environment.

The robot position recognition unit 106 recognizes the position of the robot 100 itself. The robot position recognition unit 106 estimates the position of the robot 100 itself, for example, by SLAM using the LRF. Alternatively, the robot position recognition unit 106 may recognize the position of the robot 100 itself using a global positioning system (GPS) device.

Figure 3:
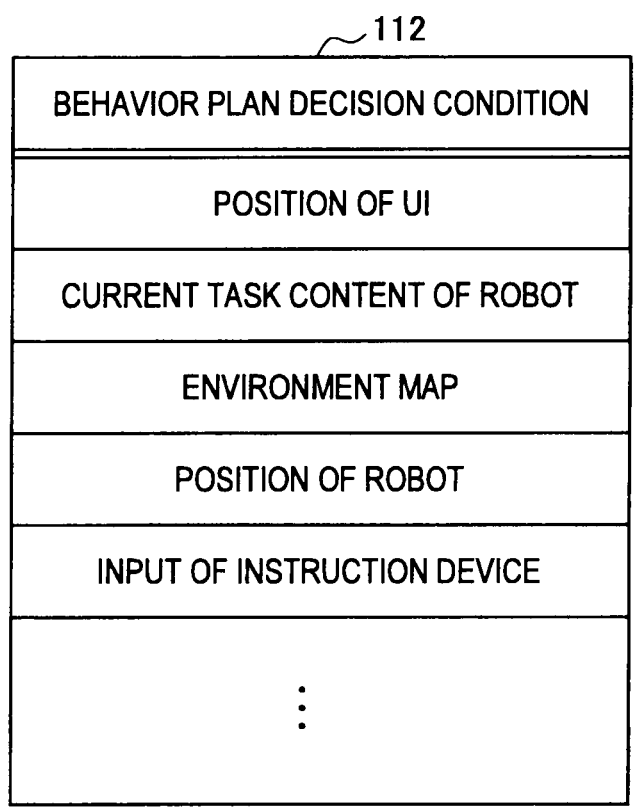
FIG. 3 is a table illustrating an example of a behavior plan decision condition according to the same embodiment.

The behavior plan unit 110 detects a behavior plan decision condition and decides one of a plurality of behavior plan candidates as a future behavior plan based on the behavior plan decision condition. The behavior plan refers to a plan representing an action that is to be performed in the future by the robot 100. For example, the behavior plan candidates refer to a plurality of actions such as moving, gripping an object, and transferring the object. For the behavior plan, one behavior plan is decided from among a plurality of behavior plan candidates based on the behavior plan decision condition. The behavior plan decision condition refers to a current status of the robot 100 or the external environment. For example, the behavior plan decision condition includes the position of the remote control device 150 (UI), the current task content of the robot 100, external environment information, the position of the robot 100, and an input of an instruction device such as the remote control device 150 as illustrated in FIG. 3. FIG. 3 is a table illustrating examples of the behavior plan decision condition 112 according to the present embodiment. Further, the behavior plan decision condition 112 is not limited to the above mentioned examples and may include any other condition that can be used to decide the behavior plan of the robot 100.

The storage unit 120 includes, for example, a memory and records information related to the environment map, the position of the robot 100, the behavior plan, and the position of the remote control device 150. In the information recorded in the storage unit 120, information necessary for each process is read out.

The view decision unit 130 is one example of a display control unit. The view decision unit 130 decides one of a plurality of previously prepared view (display pattern) candidates, as display content to be displayed on the remote control device 150, based on the behavior plan decided by the behavior plan unit 110. The view decision unit 130 displays the decided view on the remote control device 150. The view displayed on the remote control device 150 may include an environment map, a target object display, a robot view, and the like.

The drive unit 140 enables the robot 100 to move or operate. The drive unit 140 drives based on a signal autonomously generated by the robot 100 itself or a signal generated by the user's operation.

Further, although not shown in FIG. 1, the robot 100 may include a communication unit. The communication unit transmits information recorded in the storage unit 120 or the view decided by the view decision unit 130 to the remote control device 150 and receives the position or an operation signal of the remote control device 150 from the remote control device 150.

[The Remote Control Device 150]

The remote control device 150 includes an interface position detection unit 152 and an interface input/output (I/O) unit 154. For example, the remote control device 150 includes a microprocessor that controls the interface position detection unit 152, the interface I/O unit 154, and the like.

The interface position detection unit 152 detects the position of the remote control device 150 (interface). The interface position detection unit 152 transmits the detected position to the robot 100. For example, the remote control device 150 includes a stereo camera, an LRF, and the like, and the interface position detection unit 152 detects the position of the remote control device 150 by SLAM using the LRF. Further, the interface position detection unit 152 may detect the position of the remote control device 150 using a GPS device.

The interface I/O unit 154 receives the display content from the view decision unit 130. The interface I/O unit 154 is a display unit including a UI screen of a touch panel type and displays an image to the user. The interface I/O unit 154 displays, for example, an environment map, a target object display, a robot view, and the like on the UI screen. Further, the interface I/O unit 154 is an operation unit through which the user of the robot 100 inputs a variety of data. For example, the interface I/O unit 154 receives the user's operation through a touch panel and generates an operation signal. The interface I/O unit 154 transmits the generated operation signal to the robot 100.

Although not shown in FIG. 1, the remote control device 150 includes a communication unit. The communication unit receives information recorded in the storage unit 120 of the robot 100 or the view decided by the view decision unit 130 and transmits the position or an operation signal of the remote control device 150 to the robot 100.

2. An Operation of an Embodiment

Next, operations of the robot 100 and the remote control device 150 according to an embodiment of the present invention will be described.

[A Display Control Process]

Figure 2:
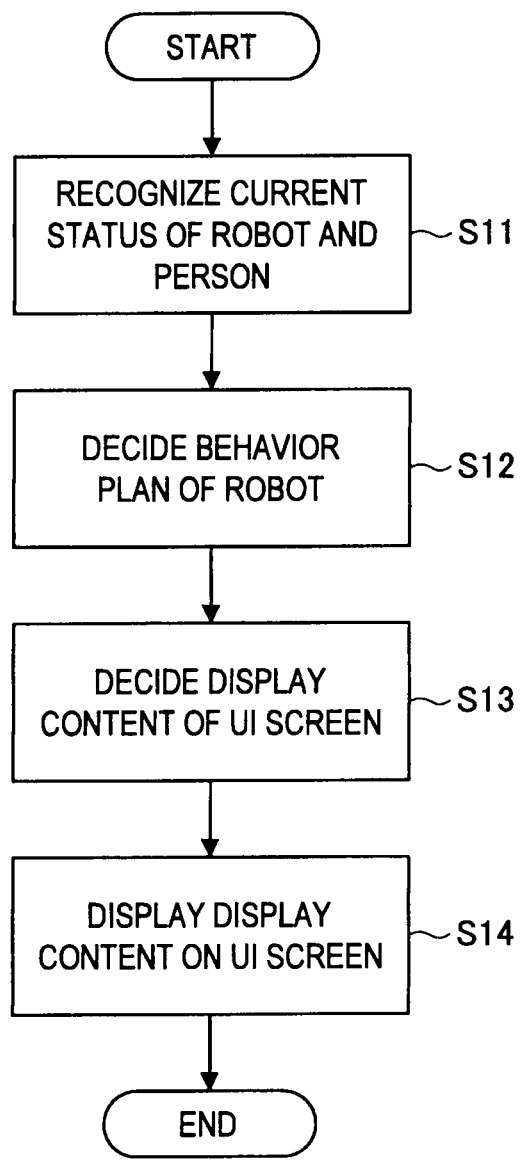
FIG. 2 is a flowchart illustrating a display control process of a UI screen of the remote control device according to the same embodiment.

First, a display control process of the UI screen of the remote control device 150 according to the present embodiment will be described with reference to FIG. 2. FIG. 2 is a flowchart illustrating the display control process of the UI screen of the remote control device 150 according to the present embodiment.

First, in step S11, the robot 100 recognizes a current status of the robot 100 itself or a current status of an external environment including a person such as a user. The recognized current status is used as the behavior plan decision condition when deciding the behavior plan of the robot 100. For example, the behavior plan decision plan includes the position of the remote control device 150 (UI), the current task content of the robot 100, the external environment information, the position of the robot 100, and the input of the instruction device such as the remote control device 150 as illustrated in FIG. 3.

Next, in step S12, the robot 100 decides a future behavior plan based on the behavior plan decision condition. For example, it is recognized whether the robot 100 is away from the remote control device 150 or adjacent to the remote control device 150, and a destination of the robot 100 is decided. Further, a behavior plan for moving the robot 100 to the destination is decided. Further, if the current task content of the robot 100 represents a state in which the target object is gripped, a behavior plan for transferring the target object to the user in the next step is decided.

In step S13, the robot 100 decides the display content of the UI screen of the remote control device 150 based on the decided behavior plan. The display content of the UI screen is content corresponding to a future behavior plan of the robot 100 and includes, for example, an environment map, a target object display, a robot view, and the like.

Thereafter, in step S14, the robot 100 transmits the display content to the remote control device 150, so that the display content decided in step S13 is displayed on the UI screen of the remote control device 150. For example, if the robot 100 has not moved yet, an environment map such as a bird's-eye view or a target object display in which a plurality of target objects are listed may be displayed so that the user can instruct the destination of the robot 100. Alternatively, if the robot is moving, an environment map from the robot's point of view or an image taken by the robot 100 may be displayed. Further, when the robot 100 has arrived at the target object, an image obtained by shooting the periphery of the target object may be displayed. Further, an environment map in which the robot 100 is objectively displayed may be displayed while the robot 100 performs a task.

Since the display content decided in step S13 is displayed on the UI screen, the user can easily remotely control the robot 100 by giving an instruction through the touch panel of the remote control device 150.

Figure 5:
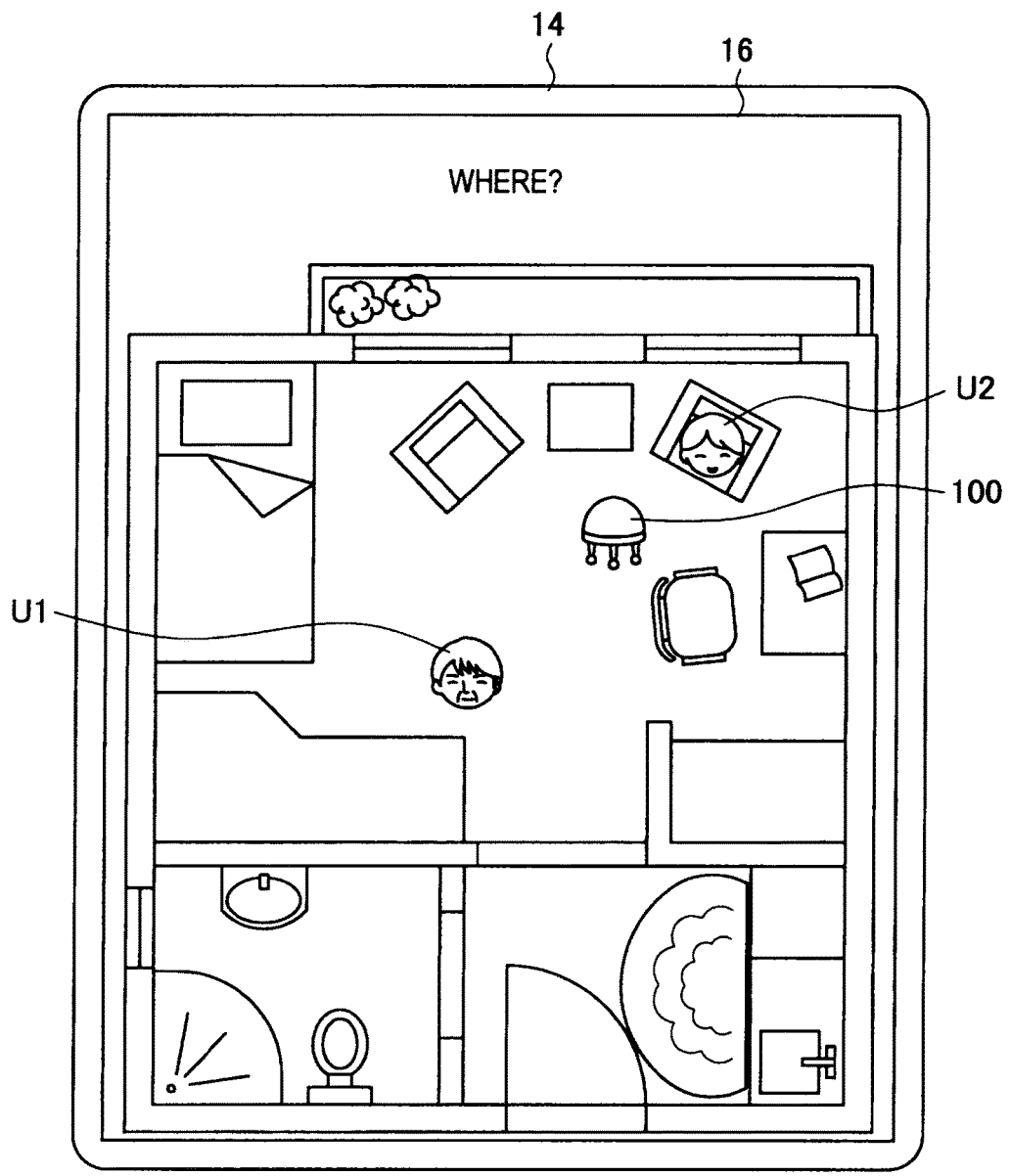
FIG. 5 illustrates a display example of an environment map displayed on a UI screen of a display of the remote control device according to the same embodiment.
Figure 6:
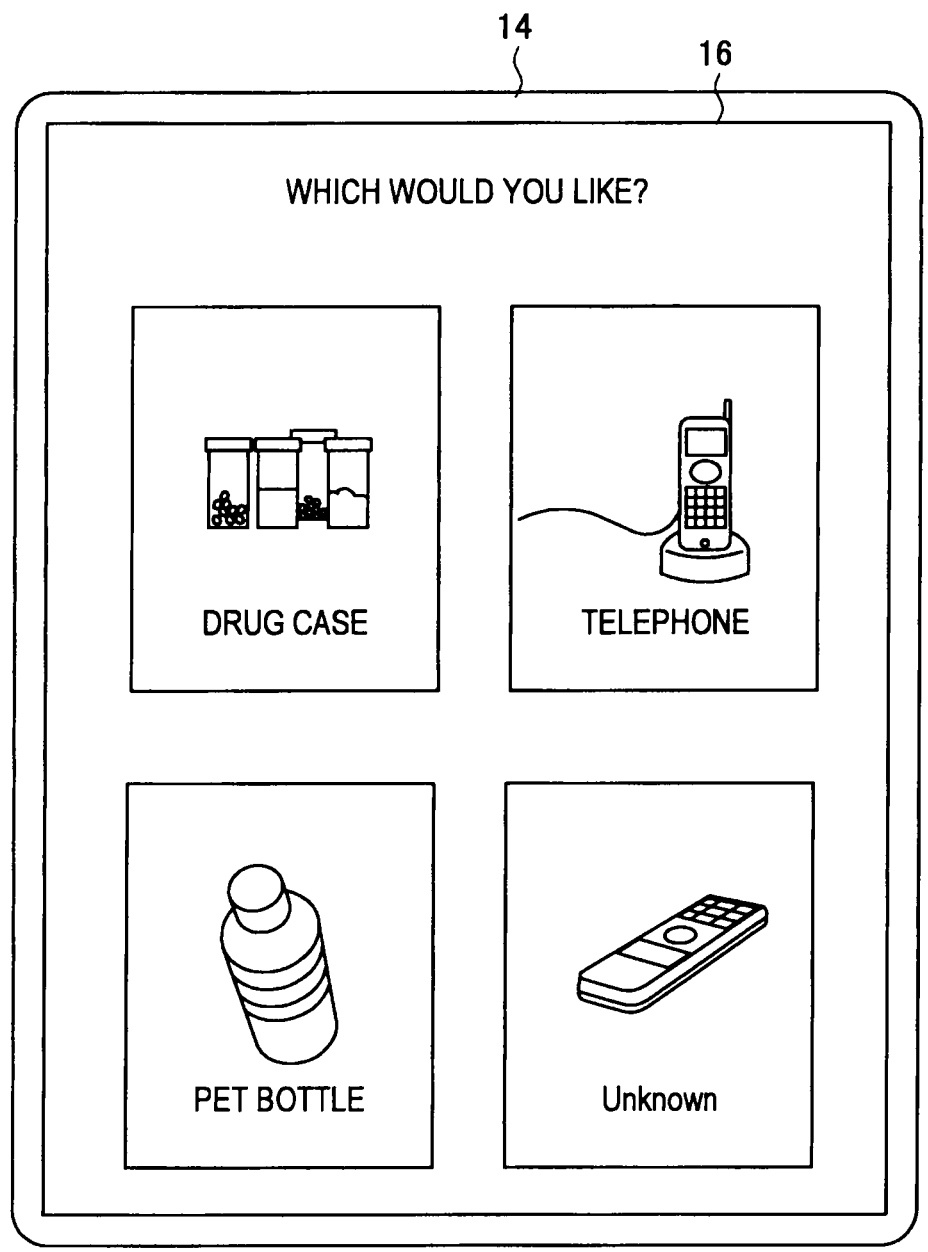
FIG. 6 illustrates a display example of a target object displayed on the UI screen of the display of the remote control device according to the same embodiment.
Figure 7:
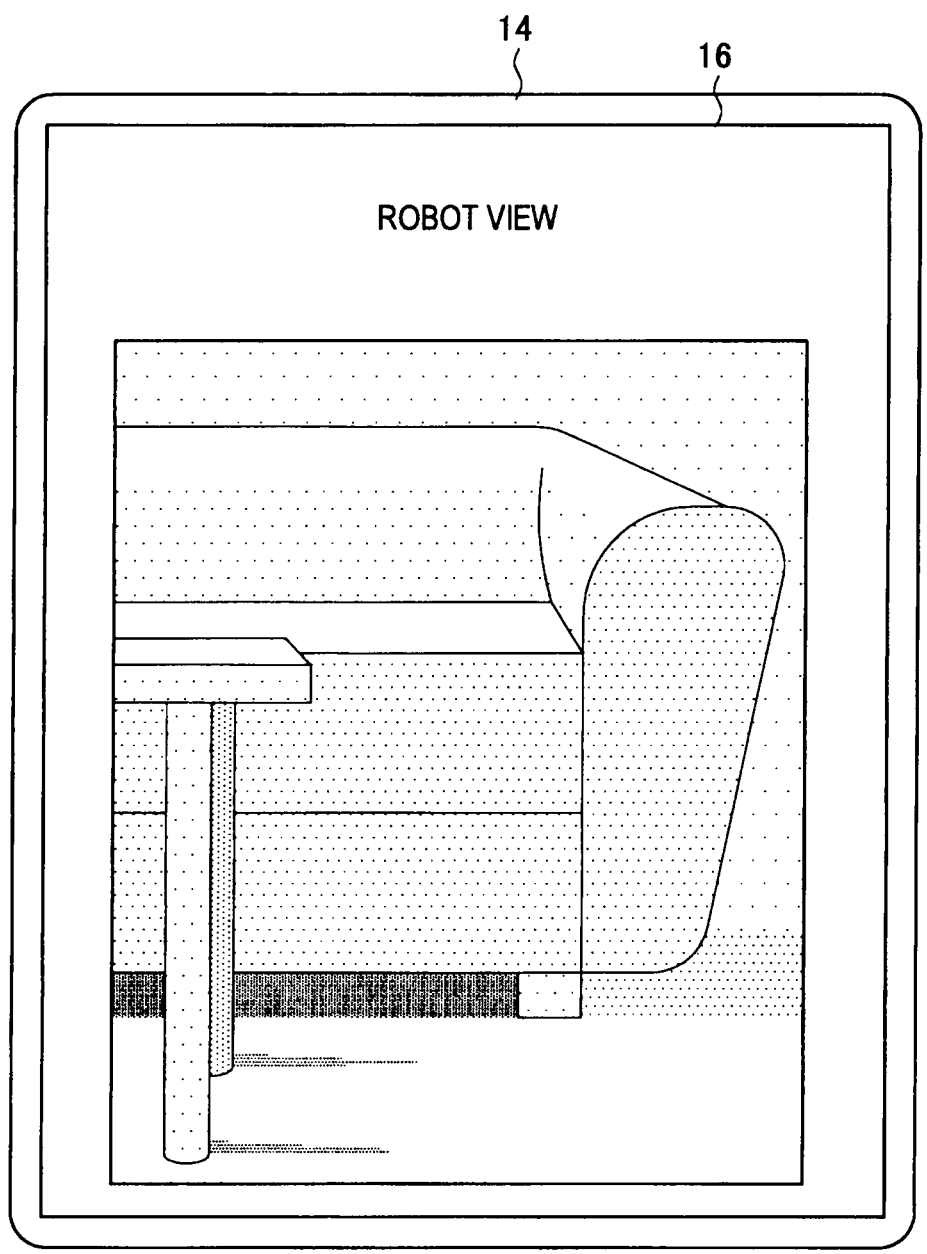
FIG. 7 illustrates a display example of a robot view displayed on the UI screen of the display of the remote control device according to the same embodiment.

FIGS. 5 to 7 illustrate display examples of an environment map, a target object display, and a robot view that are displayed on the UI screen 16 of the display 14 of the remote control device 150, respectively.

The environment map refers to a map generated by external environment recognition of the robot 100. As illustrated in FIG. 5, the room inside corresponding to the behavior plan is displayed in a bird's-eye view or displayed at the height of the robot's point of view. If a specific point in the environment map is instructed by the user (U1 or U2), a movement destination of the robot 100 is decided, or a sight line direction of the robot 100 is changed.

The target object display refers to a list display of target objects that become task candidates or movement destinations of the robot 100. For example, as the target object display, the appearances of a plurality of objects are displayed as illustrated in FIG. 6. For example, when a specific object in the target object display is selected by the user, the movement destination of the robot 100 is decided.

The robot view refers to an image taken by a camera mounted in the robot 100. The image taken by the camera is displayed as is as illustrated in FIG. 7. The robot view is displayed when the current position of the robot 100 is unclear or when the robot 100 arrives at the target object and performs a task on the target object. The robot view may be configured so that when the UI screen is touched, a touched spot is focused or zoomed in so that the object can be clearly displayed.

[A Display Switching Process]

Figure 4:
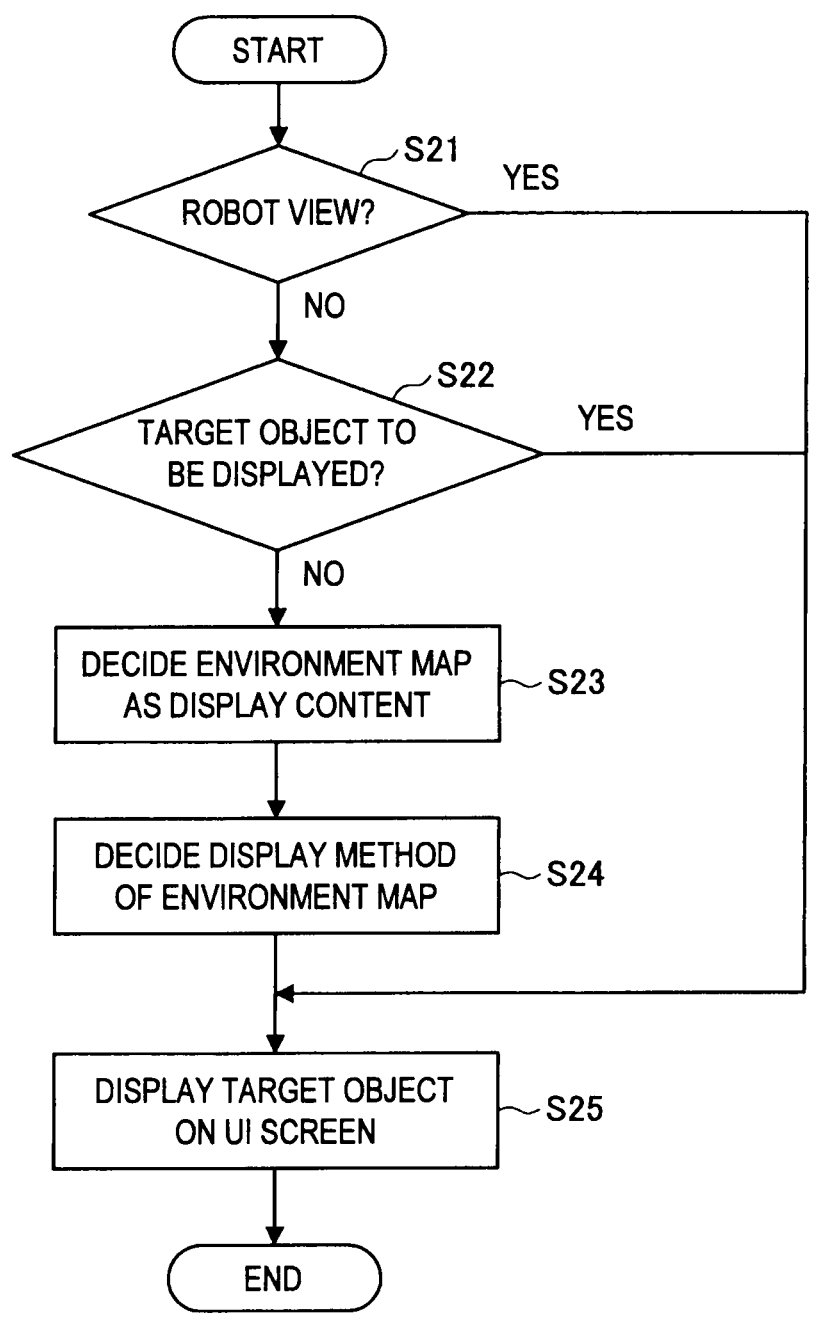
FIG. 4 is a flowchart illustrating a display switching process of the UI screen of the remote control device according to the same embodiment.

Next, a display switching process of the UI screen of the remote control device 150 according to the present embodiment will be described with reference to FIG. 4. FIG. 4 is a flowchart illustrating the display switching process of the UI screen of the remote control device 150 according to the same embodiment.

When there are three kinds of displays including a robot view, a target object display, and an environment map as a display on the UI screen, the display to be displayed is determined based on a behavior plan decision condition.

First, in step S21, it is judged based on the behavior plan decision condition whether or not the robot view is to be displayed among the three kinds of displays. When it is judged that the robot view is to be displayed, in step S25, the robot view is displayed on the UI screen. For example, the robot view is displayed when the robot 100 continuing to grip the target object is decided as the behavior plan, when the robot 100 arriving at the target object and observing the target object is decided as the behavior plan, or when the current position of the robot 100 being confirmed is decided as the behavior plan. Since the robot view is displayed, the user that operates the remote control device 150 can decide a place where the gripped target object is to be placed or observe the surrounding environment of the robot 100.

When it is judged that the robot view is not to be displayed, in step S22, it is judged whether or not the target object is to be displayed based on the behavior plan decision condition. When it is judged that the target object is to be displayed, in step S25, the target object is displayed on the UI screen. For example, the target object is displayed when selecting the destination of the robot 100 is decided as the behavior plan or when selecting the target object in the destination is decided as the behavior plan. Since the target object is displayed, when the destination of the robot 100 or the desired target object is unclear, a clear instruction can be given to the robot 100.

When it is judged that neither the robot view nor the target object display is to be displayed, in step S23, the environment map is decided as the display content. When the environment map is decided as the display content, in step S24, a display method representing how to specifically display the environment map is decided. In step S25, the environment map is displayed on the UI screen by the decided display method. For example, when selecting the destination of the robot 100 is decided as the behavior plan, the environment map may be displayed in a bird's-eye view. Further, when continuously moving the robot is decided as the behavior plan, the environment map is displayed at the robot's point of view. Further, when the robot 100 continuing an action for the user is decided as the behavior plan, the environment map in which the robot is objectively displayed is displayed. Since the environment map is displayed, when the destination of the robot 100 is unclear, a clear instruction can be given to the robot 100. Further, since the robot 100 is objectively displayed during its action, a detailed action instruction can be given to the robot 100.

As described above, according to the present embodiment, the display content appropriate for an operation in the remote control device 150 is displayed on the UI screen based on the behavior plan decision condition. Thus, the user who remotely controls the robot 100 can easily remotely control the robot 100. Further, if the behavior plan is sequentially decided and the content to display is switched according to the decided behavior plan, the user can smoothly remotely control the robot 100.

It should be understood by those skilled in the art that various modifications, combinations, sub-combinations and alterations may occur depending on design requirements and other factors insofar as they are within the scope of the appended claims or the equivalents thereof.

For example, in the above described embodiment, three kinds of display content including the robot view, the target object display, and the environment map are used as the display content of the remote control device 150, but the present invention is not limited thereto. For example, an inside status of the robot 100 (for example, a task load) may be displayed based on the decided behavior plan.

Further, the present embodiment has been described in connection with the case in which the behavior plan is clearly decided, but the present invention is not limited thereto. For example, when it is difficult to clearly decide the behavior plan according to the behavior plan decision condition, the environment map display or a plurality of operations of the robot 100 may transition to a menu selection display displayed in a list form.

The present application contains subject matter related to that disclosed in Japanese Priority Patent Application JP 2010-073033 filed in the Japan Patent Office on Mar. 26, 2010, the entire content of which is hereby incorporated by reference.

What is claimed is:

1. A device, that is remotely controlled by a remote control device, comprising:
    circuitry configured to:
        determine a behavior of the device;
        select a robot view from a plurality of predetermined display pattern candidates when the determined behavior of the device corresponds to gripping a target object; and
        switch selection from the robot view to another one of the plurality of predetermined display pattern candidates based on another determined behavior of the device.

2. The device according to claim 1, wherein the circuitry is configured to:
    recognize an environment of the device,
    generate an environment map based on the recognized environment,
    specify a position of the device or the remote control device based on the environment map, and
    determine the behavior of the device based on the position of the device or the remote control device.

3. The device according to claim 2, wherein
the position is a position of the remote control device, and
the circuitry is configured to:
    receive the position of the remote control device from the remote control device; and
    determine the behavior of the device based on the position of the remote control device.

4. The device according to claim 3, wherein the circuitry is configured to:
    recognize current task content of the device, and
    determine the behavior of the device based on the current task content of the device.

5. The device according to claim 1, wherein the circuitry is configured to:
    recognize a position of the device, and
    determine the behavior of the device based on the recognized position of the device.

6. The device according to claim 1, wherein the plurality of predetermined display pattern candidates include an environmental map, a target object display, and the robot view.

7. The device according to claim 6, wherein the target object display includes a list of display target objects that are task candidates or movement destinations of the device.

8. The device according to claim 6, wherein the robot view includes an image taken by a camera mounted on the device.

9. The device according to claim 1, wherein the behavior of the device is determined by the remote control device.

10. The device according to claim 1, wherein the behavior of the device is at least one of movement, the gripping of the target, or transferring the object.

11. The device according to claim 1, wherein the circuitry is configured to:
    detect a current status of the device in an environment; and
    determine the behavior of the device based upon the current status of the device.

12. The device according to claim 1, wherein the circuitry is configured to transmit display content, based on the selected robot view of the plurality of predetermined display pattern candidates, to be displayed on a display of the remote control device.

13. The device according to claim 12, wherein the circuitry is configured to transmit another display content, based on the another one of the plurality of predetermined display pattern candidates after the selection is switched from the robot view to the another one of the plurality of predetermined display pattern candidates, to be displayed on the display of the remote control device.

14. A remote control method of a remotely-controllable device, comprising:
   determining, by circuitry of the device, a behavior of the device;
   selecting, by the circuitry of the device, a robot view from a plurality of predetermined display pattern candidates when the determined behavior of the device corresponds to gripping a target; and
   switching, by the circuitry of the device, selection from the robot view to another one of the plurality of predetermined display pattern candidates based on another determined behavior of the device.

15. A non-transitory computer-readable storage medium storing computer-readable instructions that, when executed by a processor of a remotely-controllable device, cause the device to execute a method comprising:
   determining a behavior of the device;
   selecting a robot view from a plurality of predetermined display pattern candidates when the determined behavior of the device corresponds to gripping a target; and
   switching selection from the robot view to another one of the plurality of predetermined display pattern candidates based on another determined behavior of the device.

16. A remote control device comprising:
   circuitry configured to:
     determine a behavior of a device that is remotely controlled by the remote control device;
     receive first display content to be displayed on a display of the remote control device from the device, wherein the first display content corresponds to a robot view that is selected from a plurality of predetermined display pattern candidates when the determined behavior of the device corresponds to gripping a target; and
     receive second display content to be displayed on the display of the remote control device from the device after selection is switched from the robot view to another one of the plurality of predetermined display pattern candidates that is selected based on another determined behavior of the device.

17. A system comprising:
   a remote control device; and
   a device, that is remotely controlled by the remote control device, including circuitry configured to:
     determine a behavior of the device;
     select a robot view from a plurality of predetermined display pattern candidates when the determined behavior of the device corresponds to gripping a target; and
     switch selection from the robot view to another one of the plurality of predetermined display pattern candidates based on another determined behavior of the device.

* * * * *